United States Patent [19]
Tobiasz

[11] 3,942,843
[45] Mar. 9, 1976

[54] METHOD OF BRAKING A VEHICLE HAVING AN ANTISKID BRAKE CIRCUIT, AND A MODULATOR FOR SUCH A CIRCUIT

[75] Inventor: Andre Tobiasz, Le Blanc-Mesnil, France

[73] Assignee: Societe Anonyme D.B.A., Paris, France

[22] Filed: June 5, 1974

[21] Appl. No.: 476,358

[30] Foreign Application Priority Data
June 6, 1973  France .............................. 73.20579

[52] U.S. Cl. ................................. 303/21 F; 303/61
[51] Int. Cl.² ............................................ B60T 8/04
[58] Field of Search ................... 188/181 R, 181 A; 303/21 R, 21 C, 21 CF, 21 CG, 21 F, 61

[56] References Cited
UNITED STATES PATENTS

| | | | |
|---|---|---|---|
| 3,466,098 | 9/1969 | Pieren et al. ....................... | 303/61 X |
| 3,614,176 | 10/1971 | Holst et al. ........................... | 303/61 |
| 3,727,992 | 4/1973 | Bowler et al. ...................... | 303/61 X |

*Primary Examiner*—Duane A. Reger
*Attorney, Agent, or Firm*—Ken C. Decker; William N. Antonis

[57] ABSTRACT

A method of braking a vehicle having an antiskid brake circuit of the type having a modulator of which the modulator chamber is connected to a set of brake actuators, and a plunger projecting into the chamber, the plunger being moved by way of a driving assembly operated by a motor driven by an antiskid control device, responsive to rotary motion of the vehicle. The curve ploting the variation with time, in the volume of the modulation chamber from the position of maximum penetration by the plunger follows substantially the same course as the absorption curve for the set of brake actuators connected to the modulator. This absorption curve represents the increase in pressure in the brake actuator as a function of the increase in the volume of fluid contained in the brake actuator.

A hydraulic pressure modulator for an antiskid brake circuit for a braked vehicle which comprises a housing containing a modulation chamber capable of being connected to a set of brake actuators for a vehicle and a plunger slidable in the housing and projecting into the chamber. The plunger is moved by way of a driving assembly operated by an antiskid control device responsive to rotary motion of at least one wheel of the vehicle, so as to permit variation of the braking pressure in the brake actuators. The driving assembly comprises a mechanical transmission with a cam driven by a continuously rotating electric motor. The angular motion of the cam in a given direction is associated with motion of the plunger in a given direction; whereas angular motion of the cam in the opposite direction causes motion of the plunger in the opposite direction. Each angular movement of the cam is responsive to rotation of the motor, said rotation being controlled by a signal generated by the antiskid device.

16 Claims, 6 Drawing Figures

METHOD OF BRAKING A VEHICLE HAVING AN ANTISKID BRAKE CIRCUIT, AND A MODULATOR FOR SUCH A CIRCUIT

The present invention relates primarily to a method of braking a vehicle having an anti-skid brake circuit. Brake circuits of this type are equipped with means for modulating the braking pressure applied to the brake actuators for the vehicle wheels from skidding.

Known modulators of this type comprise a modulation chamber connected to a set of brake actuators in the vehicle and a plunger projecting into the chamber, the plunger being moved by an external force controlled by an anti-skid control device responsive to rotary motion of at least one wheel of the vehicle, so as to permit variation of the effective volume of the modulation chamber and consequent modulation of the braking pressure in the brake actuators. This external force is usually transmitted by a piston reciprocated by means of pressure fluid from an auxiliary source. The pressure fluid circulates in an auxiliary circuit containing one or more solenoid valves operated by the anti-skid control device. The two principal disadvantages are that the auxiliary pressure fluid circuit requires a large number of components; and that the inertia of the auxiliary hydraulic circuit and the transient phenomena which occur during modulation are such that it is practically impossible for the designer to predetermine the plunger motion.

The present invention seeks therefore, to predetermine the motion of the plunger.

The invention consists of a method of braking a vehicle having an anti-skid brake circuit of the type having a modulator of which the modulation chamber is connected to a set of brake actuators for the vehicle and a plunger projecting into the chamber, the plunger being moved by way of a driving assembly operated by an anti-skid control device responsive to rotary motion of at least one wheel of the vehicle, wherein the curve plotting the variation with time in the volume of the modulation chamber from the position of maximum penetration by the plunger follows substantially the same course as the absorption curve for the set of brake actuators connected to the modulator, the absorption curve representing the increase in pressure in the brake actuators as a function of the increase in the volume of fluid contained in the brake actuators.

By means of the invention the motion of the plunger can be predetermined.

The invention also consists of a hydraulic pressure modulator for an anti-skid brake circuit for a vehicle, the modulator comprising a housing containing a modulation chamber capable of being connected to a set of brake actuators for a vehicle and a plunger slidable in the housing and projecting into the chamber, the plunger being moved by way of a driving assembly operated by an anti-skid control device responsive to rotary motion of at least one wheel of the vehicle, so as to permit variation of the braking pressure in the brake actuators, the modulator being characterized in that the driving assembly comprises a mechanical transmission with a cam rotated by a continuously rotating electric motor, angular motion of the cam in a given direction being associated with motion of the plunger in a given direction, whereas motion of the cam in the opposite direction causes motion of the plunger in the opposite direction, each angular movement of the cam being responsive to rotation of the motor, said rotation being controlled by a signal generated by the anti-skid control device.

The invention will now be described with reference to the accompanying drawings, in which.

Figure 1:
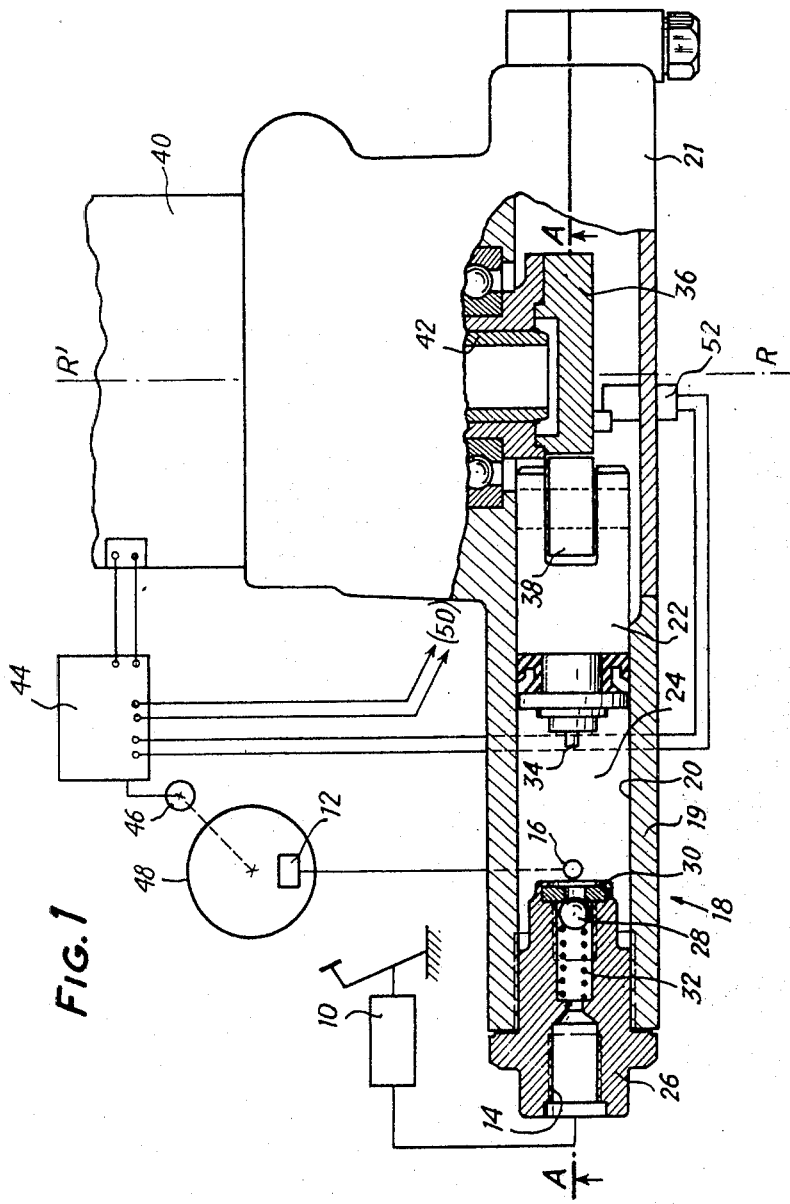
FIG. 1 represents an anti-skid brake circuit, with a modulator embodying the invention and shown in partial longitudinal section along a line B—B.
Figure 2:
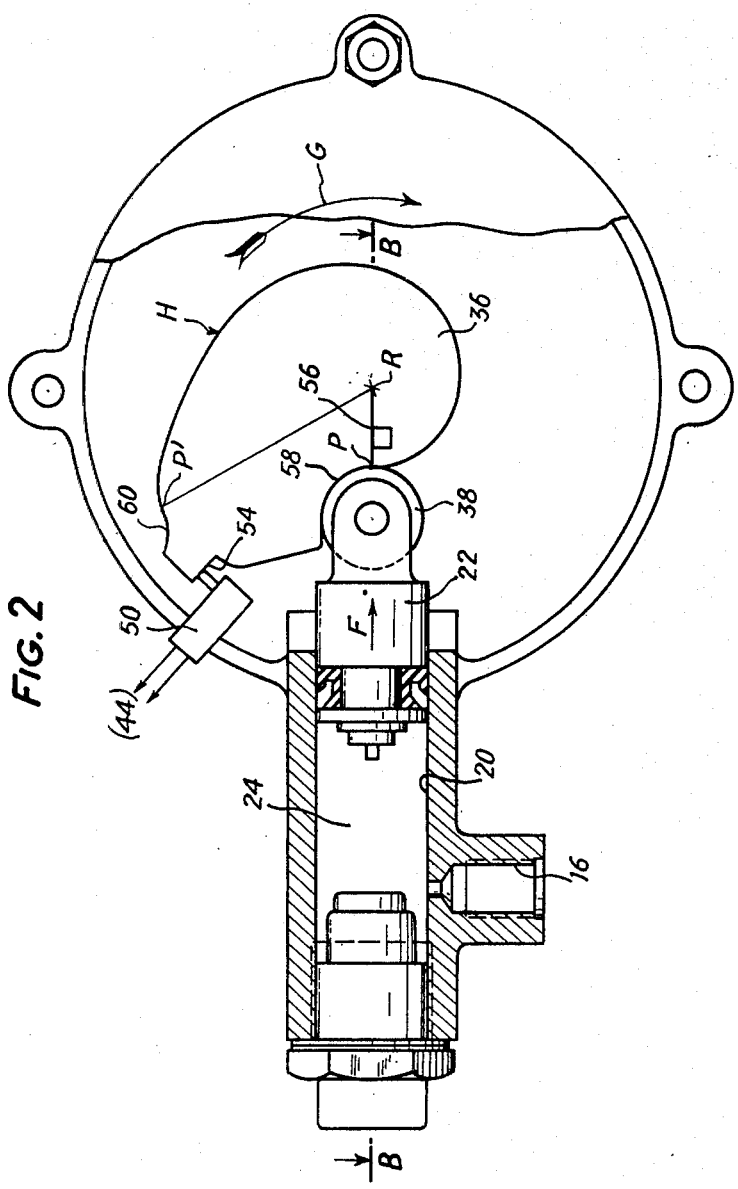
FIG. 2 represents a partial cross-section along a line A—A through the modulator shown in FIG. 1.

Referring now to the drawings, FIGS. 1 and 2 show an anti-skid brake circuit comprising a master cylinder 10 and a set of brake actuators 12, connected respectively to the inlet orifice 14 and outlet orifice 16 of a modulator 18. The modulator 18 comprises a housing 19 and a cover 21. The housing 19 contains a bore 20 in which a plunger 22 moves in a fluid-tight manner, defining a modulation chamber 24 inside the bore. The inlet orifice 14 is in a plug 26 coaxial with the plunger 22. The plug 26 also contains a non-return valve, consisting chiefly of a ball 28 urged on to a seat 30 by a spring 32. The plunger 22 bears a stepped projection 34, which can cooperate with the plug 26 by abutting thereon, and which can also lift the ball 28 off its seat 30 when the plunger 22 occupies this abutting position, in which the plunger penetrates as far as it can into the modulation chamber 24. When the plunger is in the position of maximum penetration, therefore, the master cylinder 10 can communicate with the brakes 12, but this connection is broken as soon as the plunger leaves this position of maximum penetration and moves to the right in FIG. 1.

The free end of the plunger 22 cooperates with a cam 36 by way of a roller 38. The cam 36 is rotated by an electric motor 40 by way of speed-reducing device, part of whose take-off shaft 42 is shown in FIG. 1. The electric motor is of the continuously rotating type with permanent magnets. When supplied with 12 volts direct current its rotational speed is of the order of 6,000 rpm, and the reduction ratio of the speed-reducer is approximately 50. The supply to the electric motor is controlled by an anti-skid control device 44 receiving information from speed sensors 46, which monitor the speeds of the vehicle wheels 48 at an instant. This anti-skid control device comprises a conventional logic system which does not form part of the invention. However, it may be recalled that the speed sensors 46 transmit signals proportional to the speed of each monitored wheel 48 at an instant, and these signals are then processed by the logic system in order to generate orders to vary the braking pressure in the brakes 12. In the present case, the monitored wheels are the wheels for the set of brake actuators associated with the modulator. The logic system determines which wheel is slowest at each instant, and generates its signals as a function of the speed of this wheel. For safety reasons two limit switches 50, 52 are mounted on the housing 19 and cover 21 of the modulator respectively.

The two switches 50, 52 are designed to cooperate respectively with two stops 54, 56 on the cam, the switch 50 cooperating with stop 54, when the plunger is in its position of minimum penetration into the chamber 24, and the other switch 52 cooperating with stop 56, when said plunger is in its position of maximum penetration into the chamber. The two switches 50, 52 are connected to the antiskid control device in a manner described in detail below with reference to FIG. 3.

As FIG. 2 shows, the curve H defined by the section through the cam profile along a plane perpendicular to the rotational axis of the cam is substantially shaped like a portion of spiral with an angle of deflection of the order of 330°. The cam's rotational axis RR' is perpendicular to the plane of FIG. 2, in which it projects at the point R. FIGS. 1 and 2 show the plunger 22 in its limit position of minimum penetration. In this position, the cam 36 is bearing on the switch 50, and the roller 38 is occupying a recess 58 in the cam. Another recess 60 in the cam is provided to receive the roller when the plunger is in its position of maximum penetration. These two recesses 58, 60, whose cross-section are portions of circles, serve a dual function: they act as mechanical abutments for the cam in respect of its angle of deflection and they have a stabilizing effect, explained below. The pressure which prevails in the modulation chamber 24 during operation of the vehicle brakes creates a reaction force F running parallel to the axis of the bore. The force F tends to urge the plunger 22 out of the modulation chamber. To provide the mechanical transmission between plunger and cam with stable equilibrium positions corresponding to the two limit positions of the plunger, the contours of the recesses 58, 60 are such that at the point of contact P or P' corresponding to each limit position, the perpendicular to the curve H coincides with the radius vector PR or P'R. As a result, the reaction torque due to the force F exerted on the cam when the plunger is in one of its limit positions remains very small, certainly much less than the torque required to overcome the inertia of the motor and of the speed-reducer. The cam 36 therefore occupies a stable equilibrium position whenever the plunger is in one of its limit positions.

Figure 3:
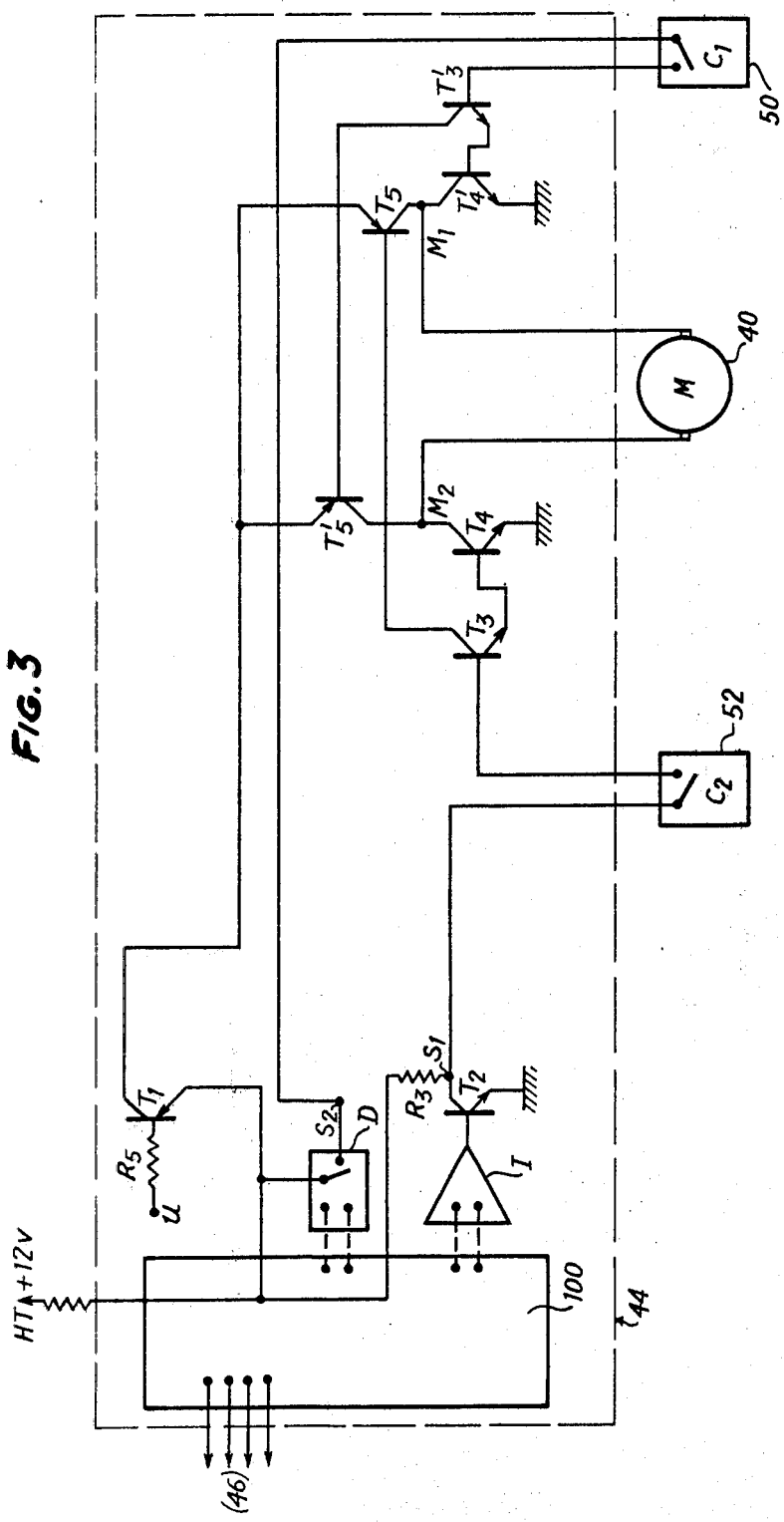
FIG. 3 is an electric circuit diagram for the supply to the electric motor driving the modulator.

The electrical supply circuit for the motor 40 is shown in FIG. 3. The anti-skid control device 44 consists principally of an electronic anti-skid logic system 100 connected to the wheel sensors 46. The logic system 100 comprises two units D and I, which for clarity's sake are shown outside the box 100 in FIG. 3. This logic system 100 is well lnown in the art and will not be described in detail here. It enables the braking pressure to be modulated in three stages: pressure relief, isolation, and pressure reapplication. Successive signals are transmitted, for example, by sensors detecting the deceleration threshold of the slowest wheel monitored. The signal to relieve and isolate are generated by the electronic switches D and I respectively, which may, for example, be threshold comparators. These comparators react to deceleration of the slowest of the wheels monitored.

The logic unit 100 is associated with a supply circuit for the motor 40. The electric motor 40, which is of the direct-current, permanent magnet type, is normally supplied with 12- volt high tension. The output S2 of the switch D is connected by the switch C1, which is associated with the limit switch 50, to the base of an npn transistor for T'3. The emitter of this transistor T'3 is connected to the base of another npn transistor T'4 whose emitter is earthed and whose collector is connected to the point M1, which is one of the terminals of the motor 40(M). The output of the electronic switch I is connected to the base of an npn transistor T2, whose emitter is grounded, and whose collector is connected at S1 to the high tension HT by a resistance R3. The point S1 is also connected, by the switch C2 associated with the limit switch 52, to the base of an npn transistor T3 of which the emitter is connected to the base of another npn transistor T4. The emitter of T4 is grounded, and its collector is connected to the other motor terminal M2. The high tension HT is connected by a resistance R3 to the collector of transistor T2. This high tension HT is also connected to the electronic switch D and to the emitter of a pnp transistor T1. The base of T1 is connected by a resistance R5 to a predetermined bias voltage source U; its emitter is connected to the emitters of two pnp transistors T5 and T'5. The base of transistor T5 is connected to the collector of transistor T3, and the base of the transistor T'5 is connected to the collector of the transistor T'3. The collector of T5 is connected to the terminal M1, whereas that of T'5 is connected to the terminal M2.

The anti-skid brake circuit just described operates as follows:

Let us assume that the circuit is idle. When the driver operates the ignition switch of the vehicle, the logic system is energized. In the idle state, the logic system does not supply any relief or isolation signal. The point S2 is therefore grounded, whereas the transistor T2 is off. A positive voltage therefore appears at the point S1.

Assuming, for example, that the cam is in a central position, the two switches C1, C2 are now closed. In this case a positive voltage appears at the base of the transistor T3 and renders the latter conductive. When T3 is conductive, the transistors T4 and T5 become also conductive. The supply to the motor itself is controlled by the transistor T1. For a given negative bias voltage U at the base of T1, therefore, a current of given intensity appears at the collector of T1. The motor is then supplied by the following route: high tension HT, transistor T5, point M1, point M2, transistor T4 and vehicle earth. Varying the bias voltage U and therefore the current at the collector of T1 varies the current passing to the armature of the motor M and therefore the speed of the motor. The direction of rotation of the motor M is such that the plunger is pushed back into its limit position farthest inside the chamber 24, so that the master cylinder 10 communicates with the set of brake actuators. The direction of rotation of the cam is indicated by an arrow G in FIG. 2. Once the plunger is in this position the stop 56 and the limit switch 52 cooperate the switch C2 opens, and the supply to the motor is cut off. If for any reason the reaction force F acting on the plunger tended to urge the plunger out of the modulation chamber, the switch C2 would close again, and the motor would push the plunger back into the limit position of maximum penetration. It should be noted, however, that because the special profile of the cam gives it a stable equilibrium position, this eventuality is rare. This property can be used, of course, for other types of cam. In conclusion, note that the logic system 100 includes a safety device which instantaneously suppresses any relief or isolation signal in the event of failure, automatically stopping modulation and opening the valve 28.

The vehicle now being braked, a "relief" order appears at the electronic switch D if there is a risk that one of the vehicle wheels will skid. This "relief" signal is intended to apply a positive high tension to the point S2. As the switch C1 is closed, the positive high tension at S2 drives the transistor T'3, which in turn drives the transistors T'4 and T'5. The motor is supplied as follows: high tension HT, transistor T1, transistor T'5, point M2, point M1, transistor T'4 and vehicle ground. The motor therefore turns in the opposite direction from before, this direction corresponding to movement of the plunger out of the modulation chamber. As a result the valve 28 closes, and also the effective volume of the modulation chamber 24 increases. The braking pressure in the set of brake actuators 12 falls. At the same time as the "relief" signal is given, an "isolation" signal is sent to the electronic switch I and renders the transistor T2 conductive, so that the point S1 is grounded when a signal is maintained at the electronic switch I. The pressure reduction in the brake actuators continues while the "relief" signal is maintained. If this signal disappears, the voltage at the point S2 returns to zero, and the supply to the motor stops since the "isolation" signal is still maintained. The cam and plunger therefore remain stationary. At times, the pressure reduction phase may continue until the cam completes its stroke. In this case the switch is then open, and the motor also stops. Once the "relief" and "isolation" signals have ceased, the supply voltage at the point S1 becomes positive again and the supply to the motor is resumed, so that the plunger is urged into the modulation chamber and the pressure in the brake actuators is thereby reapplied.

In variants of the embodiment described above, the following modifications have been made. Firstly, current-sensitive circuit breakers substituted for the switches C1 and C2 perform the same function of cutting the supply to the motor when the plunger is in either of its two limit positions. Furthermore, when the characteristics of the plunger and brake circuit are liable to produce a reaction torque too great to be absorbed by the inertia of the speed-reducer and motor and by the friction in the various components of the mechanical transmission, an electromagnetic detent means, operated automatically when the supply to the motor is cut off, is mounted on the shaft rotating the cam. This detent means is controlled by means of an electromagnetic switch operated by windings connected between the vehicle ground and the emitters of the two transistors T4 and T'4. In addition the modulator described above is associated with an anti-skid logic system of the two-phase type. In this case the electronic switch I switches over at the same time as the switch D. As soon as the "relief" signal is suppressed, therefore, the point S2 is grounded due to the change-over of the switch I, and the motor is supplied in the opposite direction. This gives modulation in two phases, but it should be noted, as before, that every movement of the motor in a given direction is initiated by a signal from the anti-skid logic element.

By means of the device embodying the invention, each rotary movement of the motor corresponds very precisely to a movement of the plunger in the modulation chamber. The vehicle designer can therefore control the laws of pressure reduction and of pressure re-application as a function of time throughout modulation. The designer can also vary two parameters in order to render a braking modulator embodying the invention particularly suitable for the type of vehicle for which it is intended. The first parameter relates to the rotational speed of the motor, the second to the geometry of the cam which drives the plunger.

As regards the rotational speed of the motor, this can vary in two different ways. The first way is to insert a voltage divider in the motor supply circuit, in particular between the emitter of T' and the transistors T5 and T'5, and to alter the division ratio by electromagnetic control means of which the winding is situated between S2 and C1. This makes it possible to render the rotational speed of the motor in the direction corresponding to a fall in the brake pressure three to four times greater, for example, than the rotational speed of the motor in the opposite direction. This result is useful because it is often necessary to reduce the braking pressure rapidly, to prevent locking of the vehicle wheels.

In a variant of the embodiment described, the same result is obtained by altering the reduction ratio in the speed-reducer.

A further method of varying the rotational speed of the motor relates to the bias voltage U. In particular, in another embodiment (not shown), the bias voltage changes with the state (open or closed) of the electronic switch D. This voltage is at a level U1 when D is open, and at a lower level U2 when D is conducting.

Figure 4:
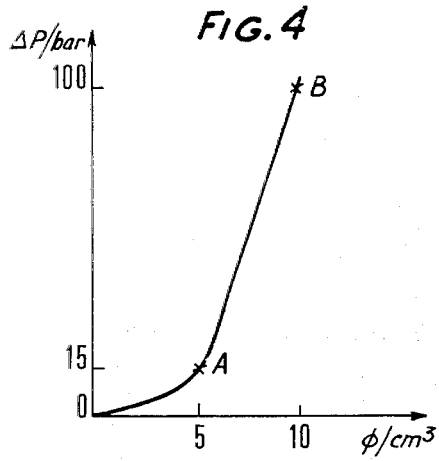
FIG. 4 is a graph showing an absorption curve for a set of brake actuators in the vehicle.
Figure 5:
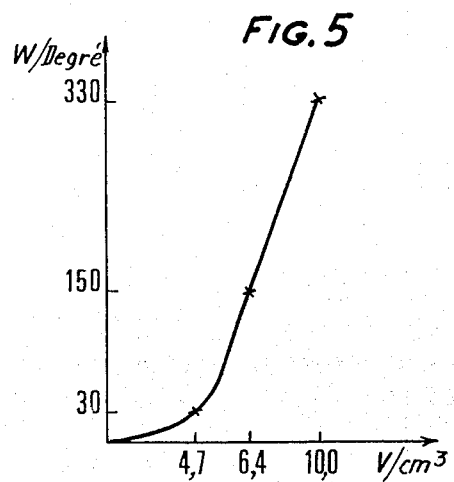
FIG. 5 is a graph showing the variation in the effective folume of the modulation chamber as a function of the angle of cam rotation.

The designer can also vary the law of the reduction in braking pressure by changing the profile of the cam and the geometry of the mechanical transmission which connects the cam to the plunger. Careful consideration of FIG. 2, and particularly of the curve H which represents the section of the cam profile in a plane perpendicular to the rotational axis of the cam, shows that the cam profile is substantially spiral. The value of the radius vector of the spiral (the distance separating the centre of rotation R from a point of contact on the curve H) has been specially chosen to suit the modulator to the set of brake actuators to which it is connected. One must remember that some absorption occurs in all brake circuits. FIG. 4 illustrates the general shape of an absorption curve for a hydraulic brake circuit. The increase Q in the volume in cubic centimeters of fluid contained in the chambers of the brake actuators associated with the modulator is plotted as abscissae, and the resulting increase in brake pressure in the actuators is plotted as ordinates. As FIG. 4 shows, when braking begins a large quantity of fluid is required to produce a substantial increase in the pressure in the brake actuators. From a point A this brake pressure increases very rapidly in substantially linear fashion. In particular, the point A corresponds to a volume change of about five cubic centimeters and a brake pressure of about 15 bars. With a device embodying the invention, therefore, a vehicle designer is in a position, once he has the absorption curve for the sets of brake actuators to which the modulator will be connected, to choose the geometry of the mechanical transmission for the modulator and the profile of the cam so as to obtain the desired variation in the effective volume of the chamber as function of time and consequently the desired variation in the brake pressure. The radius vector of the cam whose profile H is shown in FIG. 2 is calculated so that the law of pressure variation is substantially linear when the motor speed is constant. To this end, the variation in the radius vector of the cam H as a function of the angle of rotation W follows substantially the same course as the absorption curve shown in FIG. 4. The curve shown in FIG. 5 illustrates the variation in the effective volume V of the chamber 24 in cubic centimeters as a function of the angle of rotation W of the cam in degrees, the origin corresponding to cooperation between the point P' and the roller 38. As FIG. 2 shows, the cam 36 occupies a position in which its angle of rotation is about 330°. With such a profile, seeing that at the beginning of modulation the pressure in the brake actuators was more than some 50 bars, the pressure reduction obtained is substantially linear, as is the restoration of pressure, provided of course that the motor speed remains constant throughout a modulation phase. Clearly, this speed can be varied so that the gradients for the pressure fall and pressure re-application have different absolute values. The invention therefore provides the designer with every opportunity to adapt the modulator to the associated set of brake actuators. In the case of two-phase modulation, for example, the curve plotting the brake pressure against time is serrated.

Figure 6:
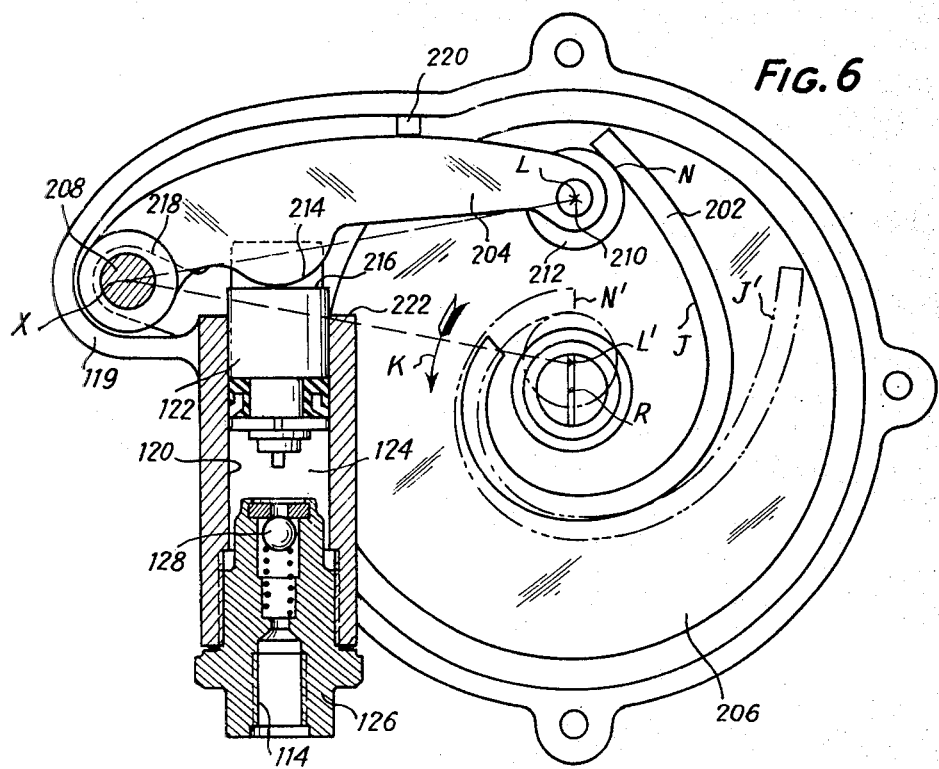
FIG. 6 represents a transverse view, partly in section of another modulator according to the invention.

FIG. 6 is a transverse view of a modulator forming another embodiment of the invention, in particular with a different type of mechanical transmission between the electric motor and the plunger. In it, the modulation chamber 124 is situated in the bore 120 and is subject to a ball 128 in a plug 126, which contains the orifice 114 to be connected to the master cylinder of the vehicle. A plunger 122 is slidable in the chamber and is connected to a cam 202 by a lever 204. The cam 202 is rotatable about an axis perpendicular to the plane of FIG. 6 and is mounted on a plate 206 driven by an electric motor by way of a speed-reducer (not shown). The lever 204 is pivotable about a pin 208 attached to the modulator housing 119. In FIG. 6 only the modulator bore is in section, the remainder of the device being as seen after removal of the cover. The free end of the lever 204 bears a projection 210 parallel to the rotational axis of the cam 202 and bearing a roller 212. The roller 212 cooperates with the cam surface at a point N. This arrangement enables the lever to move without interfering with the cam. The free end of the plunger 122 contains a slot capable of receiving another cam surface 214, which abuts on the bottom 216 of the slot. A wire return spring 218 places round the pin 208 biases the lever 204 to maintain contact between the roller 212 and cam 202. The stroke of the plunger 122 is limited by the angle of deflection of the lever 204. This angle is represented by the angle XL, XL'. X represents the rotational axis of the lever 208, whereas L and L' are points representing the rotational axis of the roller 212 in the two limit positions of the lever 204. In these limit positions the lever cooperates with two stops 220, 222 provided on the modulator housing. The remainder of the anti-skid brake circuit is similar to that described above, and there is no need here for a detailed description of it or of its operation. In the present case the limit switches are replaced by current-sensitive circuit breakers, very similar to that encountered in the first embodiment of the invention. However, the limit position of minimum penetration of the plunger 122 corresponds to the maximum length of the radius vector of the spiral joining the centre of rotation R to the point of contact N. For comparison, the position of the cam 202 when the plunger occupies its limit position of maximum penetration is indicated by chain lines. In this case the section of the cam profile occupies a curve J', and the point of contact between the roller 212 and the cam 202 is N'. To move from position J to position J', the motor rotates in the direction of the arrow K, i.e., anticlockwise. In the latter position the perpendicular to the curve J' at the point of contact N' substantially coincides with the radius vector RN'. As a result, and allowing for manufacturing tolerances, the moment of the torque exerted on the cam by the reaction force acting on the plunger is substantially zero, and the cam then remains stationary, without any detent means being required. As the cam turns out of this limit position in which the plunger penetrates as far inside the chamber 24 as possible, the angle which the perpendicular to the profile at the point of contact between the cam and roller forms with the radius vector at the same point, will increase progressively. This tends to increase the reaction torque acting on the cam. However, the cam will remain stable wherever it stops, because the pressure acting on the plunger will diminish appreciably, the further the plunger moves out of the bore 120. Consequently, the torque transmitted from the plunger to the cam, whatever the position of the cam, will always be low enough to be offset by the frictional and inertia forces in the motor and reducer. In a variant of the embodiment described with reference to FIG. 6, the cam surface is in the form of a groove cut in a rotary plate, and a projection attached to the lever and substantially parallel to the rotational axis of the plate moves along the groove.

Although in the embodiments described the plungers 22 and 122 are slidable in bores and carry out linear reciprocating motions, the invention is not restricted to this type of modulator. In particular, it covers modulators having a plunger formed by part of a torus and rotatable about the axis of the torus, and to modulators with plungers which carry out linear motions, but whose effective cross-sections vary in the course of these motions.

I claim:
1. In a vehicle antiskid braking system, a modulator comprising a housing defining a modulating chamber therewithin, said housing having an inlet and an outlet communicating said modulating chamber to a pressure source and to the brakes of the vehicle respectively, valve means within said housing for controlling communication between the inlet and outlet, a plunger slidably mounted in said modulating chamber for controlling the fluid pressure level at said outlet, said plunger being shiftable between first and second positions to hold said valve means open when the plunger is disposed in the first position, said valve means closing when the plunger is moved away from the first position, driving means for actuating said plunger, said driving means including a rotatable cam operably connected with said plunger, an electric motor for driving said cam, said motor normally driving said cam in a normal direction moving said plunger to said first position, control means for detecting an incipient skidding condition of a vehicle wheel and operatively connected to said motor, said motor being responsive to said control means to drive said cam in a direction reverse to said normal direction when an incipient skidding condition is detected to thereby drive said plunger away from said first position, and switch means operatively connected to said cam for terminating rotation of the latter when said plunger reaches either said first or said second positions.

2. A modulator as claimed in claim 1 wherein said control means generates decay and isolation signals, said control means causing said motor to rotate said cam in said direction reverse to said normal direction during generation of the decay signal.

3. A modulator as claimed in claim 2, wherein said control means controls said motor to interrupt rotation of said cam means when the isolation signal is generated and said decay signal is terminated.

4. A modulator as claimed in claim 3 wherein said switch means restricts rotation of the cam to an arc of less than 360°.

5. A modulator as claimed in claim 1, wherein said motor drives said cam in said reverse direction at approximately two to four times the speed that the cam is driven in said normal direction.

6. A modulator as claimed in claim 1, wherein a roller is associated with said plunger, said roller cooperating with said cam to transfer movement of the latter to said plunger.

7. A modulator as claimed in claim 1, including detent means carried by said housing, said detent means engaging said cam when said motor stops to prevent rotation of the cam.

8. A modulator as claimed in claim 1, wherein the curve defined by a section through the profile of the cam is substantially spirally shaped.

9. A modulator as claimed in claim 6, wherein recesses are provided in said cam to receive said roller, said roller when engaged with said recesses, restricting rotation of said cam.

10. A modulator as claimed in claim 6, wherein a lever pivotally mounted on said housing interconnects the cam and the plunger, said plunger moving in response to pivoting of the lever.

11. A modulator as claimed in claim 10, wherein said lever includes a projection extending from one end thereof, said projection extending generally parallel to the rotational axis of the cam.

12. A modulator as claimed in claim 11, wherein a groove is defined in said cam, said projection moving along said groove.

13. A modulator as claimed in claim 11, wherein said lever includes a roller mounted on said transverse projection, said roller engaging said cam.

14. A modulator as claimed in claim 10, wherein a return spring yieldably urges said lever into contact with said cam.

15. A pressure modulator as claimed in claim 1 wherein the cam is connected to the electric motor by way of a speed reducer.

16. A pressure modulator as claimed in claim 15, wherein the reducer comprises means for varying the speed reduction ratio.

* * * * *